United States Patent [19]

Vanbragt

[11] Patent Number: 4,650,509

[45] Date of Patent: Mar. 17, 1987

[54] FLUID LAMP FABRICATION METHOD

[76] Inventor: Willy Vanbragt, 544 Weddell #7, Sunnyvale, Calif. 94086

[21] Appl. No.: 702,810

[22] Filed: Feb. 19, 1985

Related U.S. Application Data

[62] Division of Ser. No. 513,470, Jul. 13, 1983, Pat. No. 4,511,952.

[51] Int. Cl.[4] ............................................ C03B 23/20

[52] U.S. Cl. ........................................ 65/4.1; 65/36; 65/4.3

[58] Field of Search ............... 65/4.1, 4.3, 36, DIG. 9; 362/181; 431/344

[56] References Cited

U.S. PATENT DOCUMENTS

| | | | |
|---|---|---|---|
| 1,237,035 | 8/1917 | Hayden | 362/157 |
| 3,262,251 | 7/1966 | Hicks, Jr. | 65/4.3 |
| 3,485,609 | 12/1969 | Deck | 65/36 |
| 3,835,579 | 9/1974 | Beaudouiv | 431/344 |
| 3,967,944 | 7/1976 | Keller et al. | 65/36 |
| 4,376,675 | 3/1983 | Derrotta | 65/36 |
| 4,415,614 | 11/1983 | Von Loewis of Menar | 65/36 |

*Primary Examiner*—S. Leon Bashore
*Assistant Examiner*—Michael K. Boyer
*Attorney, Agent, or Firm*—Willis E. Higgins

[57] ABSTRACT

A method for making a fluid lamp assembly which includes a fiberglass wick, consisting of approximately 100 individual fibers in a bundle, is inserted in a glass tube, adjusted with its tip a desired distance above opening, and fused in place by heating to 600 degrees Centigrade for 20 minutes. Fusing temperatures of from about 500 to 600 degrees Centigrade may be employed, for times of from about 10 minutes to about one hour, with a longer fusing time employed with lower temperatures. This provides a premanent wick that is not consumed in use of the lamp assembly.

6 Claims, 5 Drawing Figures

FLUID LAMP FABRICATION METHOD

This is a divisional of co-pending application Ser. No. 06/513,470 filed July 13, 1983, now U.S. Pat. No. 4,511,952.

BACKGROUND OF THE INVENTION

1. Field of the Invention

This invention relates to an improved form of a fluid lamp assembly. More particularly, it relates to such an assembly which can be used to convert other household articles for use as a fluid lamp without preventing their use for their original purpose.

2. Description of the Prior Art

The art pertaining to the design of oil lamps is an old one. In general, oil lamps function by immersing one end of a wick in a reservoir of oil, allowing the oil to move to another end of the wick which is elevated above the oil, and lighting the elevated end. Recently, there has been an increased interest in decorative oil lamps blown or otherwise constructed of glass. Oil lamps in the prior art are articles which are dedicated to that purpose alone.

Most households have a variety of candleholders, decorative electric lamps, and the like around the household. Again, these products are dedicated to a single usage. However, there are times that it is desired to change the atmosphere in a room without permanently altering the fixtures in the room.

SUMMARY OF THE INVENTION

Accordingly, it is an object of this invention to provide a fluid lamp assembly that can be used to convert other household articles to use as an fluid lamp, without permanently altering the articles.

It is another object of the invention to provide such an assembly which can be used to convert candleholders, electric lamps and similar articles to use as fluid lamps, while allowing the articles to be used for their original purpose when not used as fluid lamps.

It is a further object of the invention to provide an improved fluid lamp design.

The attainment of these and related objects may be achieved through use of the novel fluid lamp assembly herein disclosed. This assembly functions as an attachment for converting other articles, particularly candleholders, to use as a fluid lamp. The articles for conversion should have an upwardly facing cup or similar orifice into which the fluid lamp assembly can be inserted. The assembly includes a resilient, frustoconical insert dimensioned to be held by the cup of a candleholder or a similar orifice on another article. The insert has a centrally disposed, axially extending opening. A fluid lamp has a bottom with a projecting tip dimensioned and configured to be held in the opening of the insert. In practice, the insert is desirably implemented with a one hole rubber stopper.

The assembly of this invention conveniently replaces a conventional candle in the cup of a candleholder. Given an insert of the proper size, the assembly can also be placed in an incandescent electric light bulb socket as well. When it is desired to return such articles to their original use, the assembly is simply removed from the cup or socket and replaced with a candle or light bulb.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Figure 1:
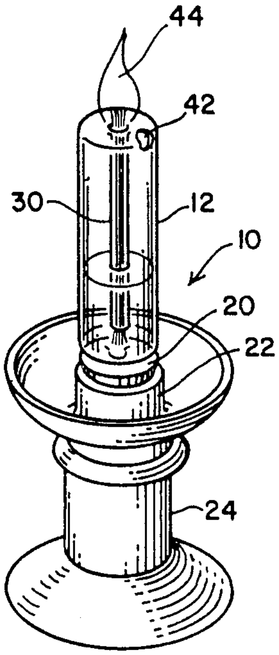
FIG. 1 is a perspective view of a fluid lamp assembly in accordance with the invention.
Figure 2:
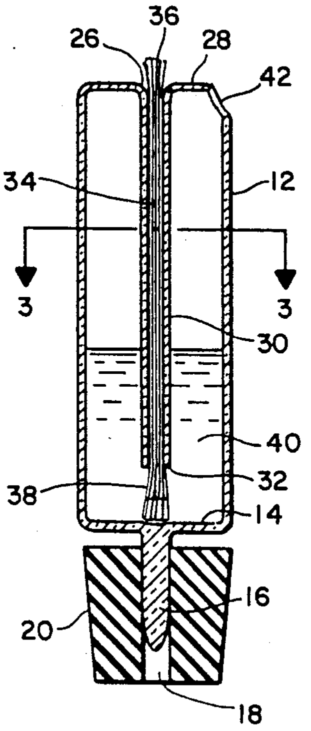
FIG. 2 is a cross section view taken along the line 2—2 in FIG. 1.
Figure 3:
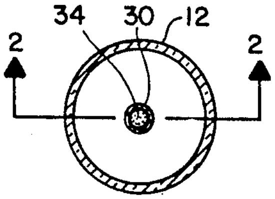
FIG. 3 is a cross section view taken along the line 3—3 in FIG. 1.

Turning now to the drawings, more particularly to FIGS. 1-3, there is shown a fluid lamp assembly 10 in accordance with the invention. The assembly 10 has a hollow glass container 12 shaped like a candle, i.e., generally cylindrical in shape. The bottom 14 of the container 12 has a pointed tip 16, which is inserted into the central hole 18 of a one hole rubber stopper 20. The rubber stopper is in turn inserted into cup 22 of a conventional candlestick 24.

As is best shown in FIGS. 2 and 3, the glass container 12 has a centrally disposed opening 26 in its top 28. A cylindrical glass tube 30 extends downward into the container 12. The tube 30 terminates in end 32 short of the bottom 14 of the container 12. A fiberglass wick 34 extends along the tube 30 with its tip 36 extending slightly from the opening 26 in container 12. Remaining end 38 of the wick 34 extends to the bottom 14 of the container 12 and is immersed in a reservoir 40 of oil, alcohol or other suitable lamp fluid. A hole 42 is provided near top 28 of the container for inserting the fluid 40 with a funnel or small nozzle on a container of the fluid.

In use, the tip 36 of wick 34 is extended a lesser or greater distance above the opening 26 to determine the height of flame 44. The fluid 40 flows up the wick 34 by capillary action in a conventional manner. When it is no longer desired to use the candlestick 24 as an oil lamp, the assembly 10 is removed from cup 22 and replaced with a candle. With use of a larger rubber stopper, the assembly 10 can be inserted in an upwardly extending light bulb socket in a similar manner. It also can be inserted in decorative glass bottles and similar articles.

In an especially preferred form of the invention, the fiberglass wick 34, consisting of approximately 100 individual fibers in a bundle as commercially available, is inserted in the tube 30, adjusted with its tip a desired distance above opening 26, and fused in place by heating to 600 degrees Centigrade for 20 minutes. Fusing temperatures of from about 500 to 600 degrees Centigrade may be employed, for times of from about 10 minutes to about one hour, with a longer fusing time employed with lower temperatures. This provides a permanent wick that is not consumed in use of the assembly 10.

Figure 4:
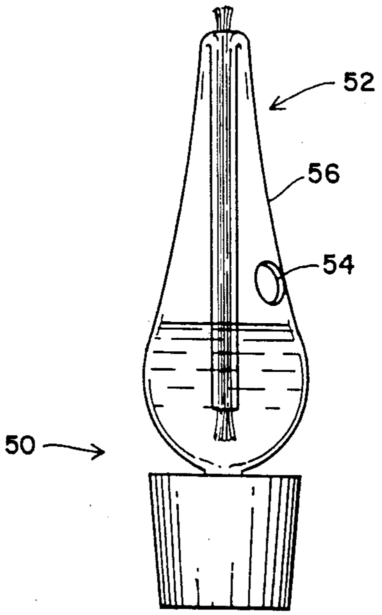
FIG. 4 is a side view of another embodiment of the invention.

FIG. 4 shows another form of an assembly 50 in accordance with the invention, in which container 52 is shaped like a flame. Opening 54 for filling container 52 is located along side 56 of the container 52.

Figure 5:
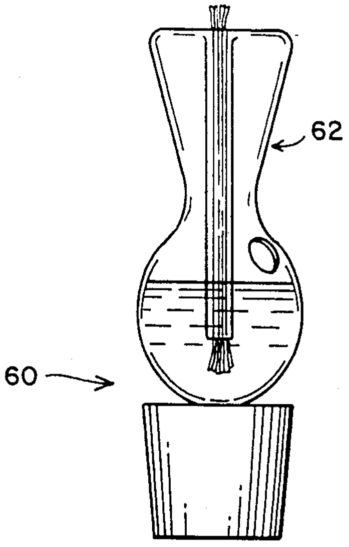
FIG. 5 is a side view of a third embodiment of the invention.

FIG. 5 shows a third form of an assembly 60, in which container 62 is fluted in shape. In all other respects, the construction and operation of the FIGS. 4 and 5 embodiments is the same as the FIGS. 1-3 embodiment.

It should now be readily apparent to those skilled in the art that a novel fluid lamp assembly capable of achieving the stated objects of the invention has been provided. The assembly allows candleholders, electric lamps and other household articles to be converted to use as an oil lamp, without permanently altering the articles, so that they can be easily returned to their original use. The construction of the oil lamp of this invention enhances its use in this manner.

It should further be apparent to those skilled in the art that various changes in form and details of the invention as shown and described may be made. It is intended that such changes be included within the spirit and scope of the claims appended hereto.

What is claimed is:

1. A method for making a a fluid lamp, which comprises inserting a plurality of glass fibers into a glass tube extending along a substantial length of the glass fibers with a top of the fibers extending from an end of the glass tube, adjusting an extent the glass fibers extend from the end of the glass tube to give a desired flame height, heating the glass fibers at a sufficient temperature for a sufficient time to fuse the plurality of glass fibers in place in the glass tube to provide a structure which allows a fluid in the lamp to flow by capillary action within the glass tube to the top of the fibers, and providing the fused glass fibers and tube extending downward and centrally disposed in a reservoir for the fluid substantially surrounding the glass fibers and tube with the top of the fibers extending from the reservoir.

2. The method of claim 1 in which the glass fibers are heated at a temperature of from about 500 to 600 degrees Centigrade.

3. The method of claim 2 in which the glass fibers are heated for a time of from about ten minutes to about one hour.

4. A method for making a fluid lamp, which comprises providing a hollow glass reservoir for the fluid having a top with an opening and a cylindrical glass tube extending from the opening toward and terminating short of a bottom of the reservoir, inserting a plurality of glass fibers into the glass tube to extend downward from the tube toward the bottom of the container with the reservoir substantially surrounding the glass fibers and the tube and a top of the fibers extending from an upper end of the glass tube, adjusting an extent the glass fibers extend from the end of the glass tube to give a desired flame height, and heating the fibers at a sufficient temperature for a sufficient time to fuse the plurality of glass fibers in place in the glass tube to provide a structure which allows the fluid in the lamp to flow by capillary action within the glass tube to the top of the fibers.

5. The method of claim 4 in which the glass fibers are heated at a temperature of from about 500 to 600 degrees Centigrade.

6. The method of claim 5 in which the glass fibers are heated for a time of from about ten minutes to about one hour.

* * * * *